Oct. 30, 1945.  F. M. M. B. SALOMON  2,387,775
OSCILLATION REDUCING DEVICE
Filed May 6, 1940  5 Sheets-Sheet 3
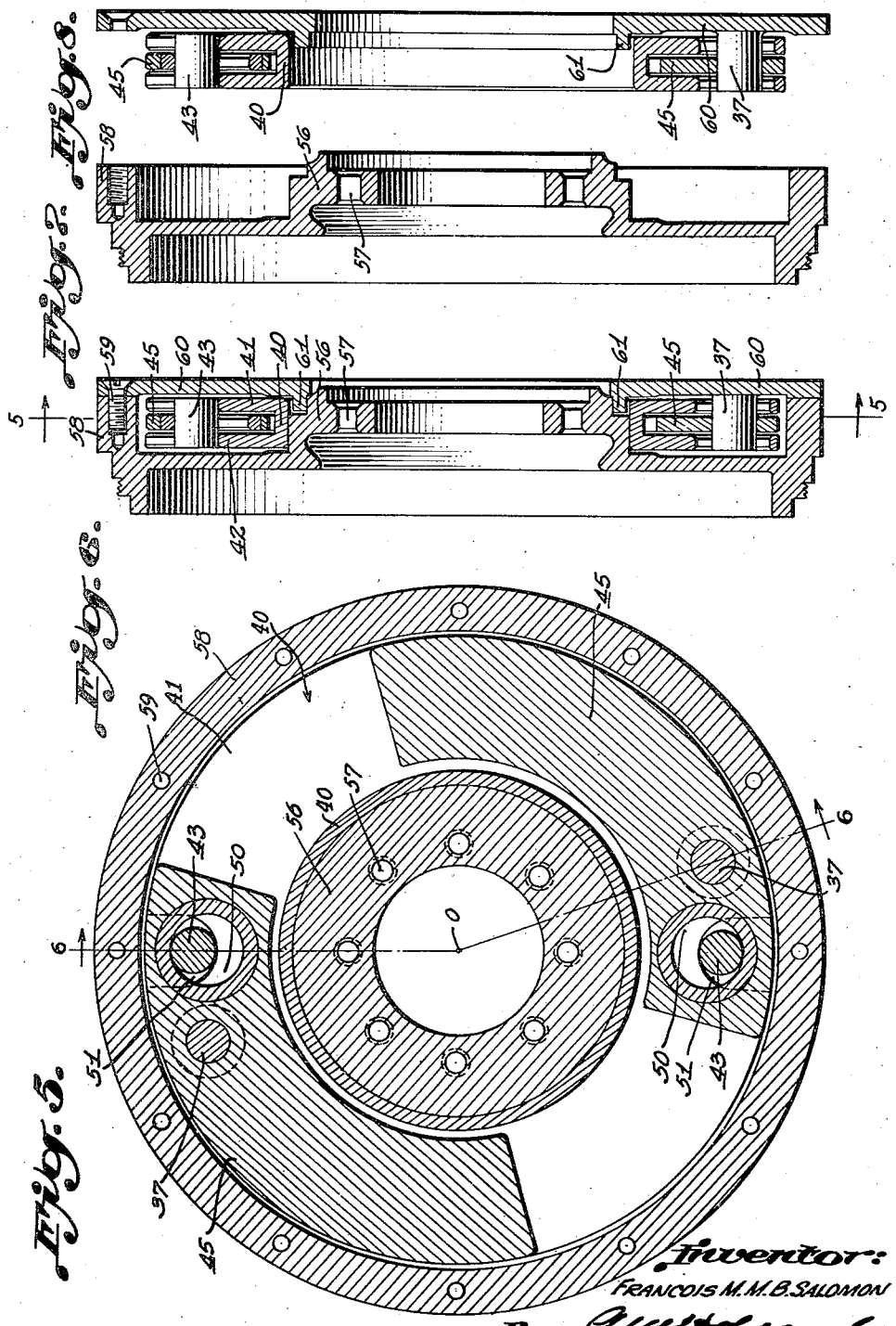

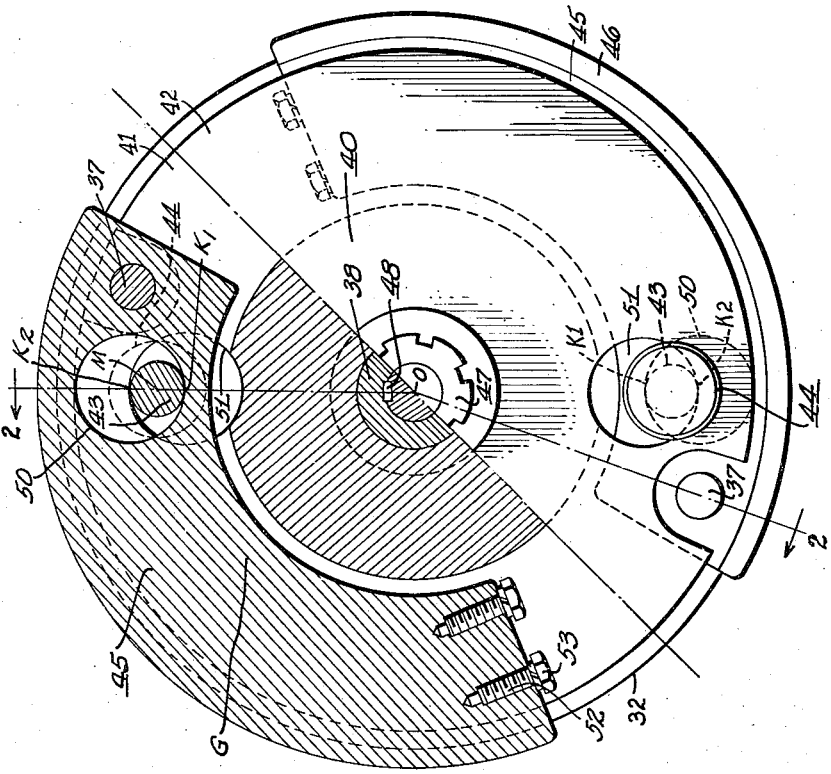

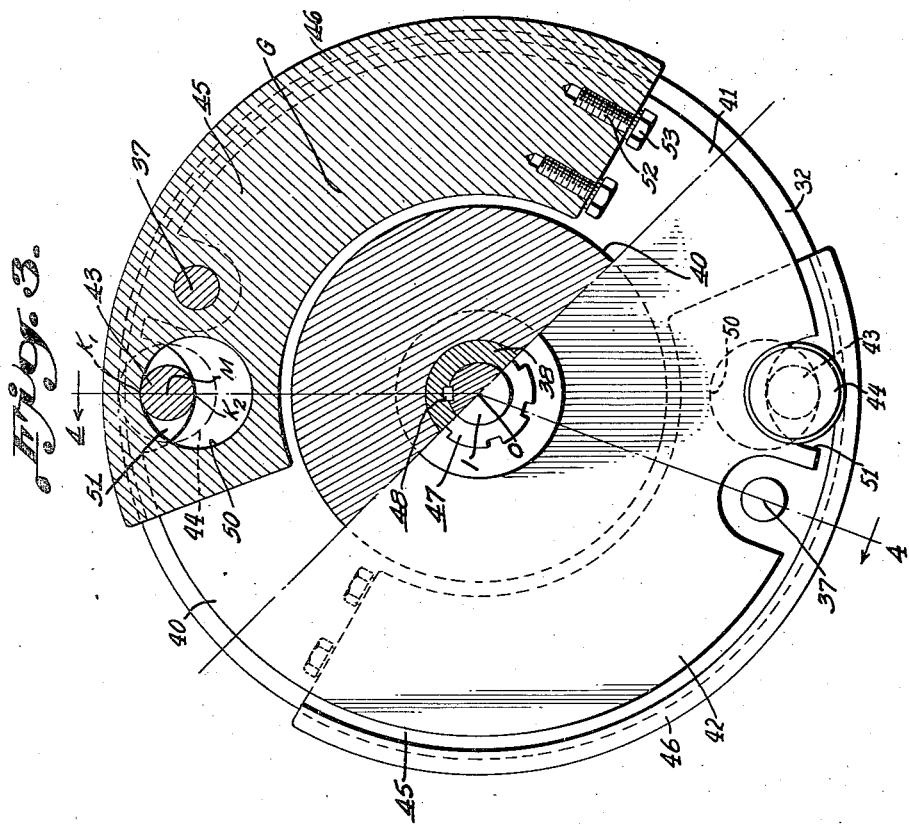

Oct. 30, 1945.  F. M. M. B. SALOMON  2,387,775
OSCILLATION REDUCING DEVICE
Filed May 6, 1940  5 Sheets-Sheet 4
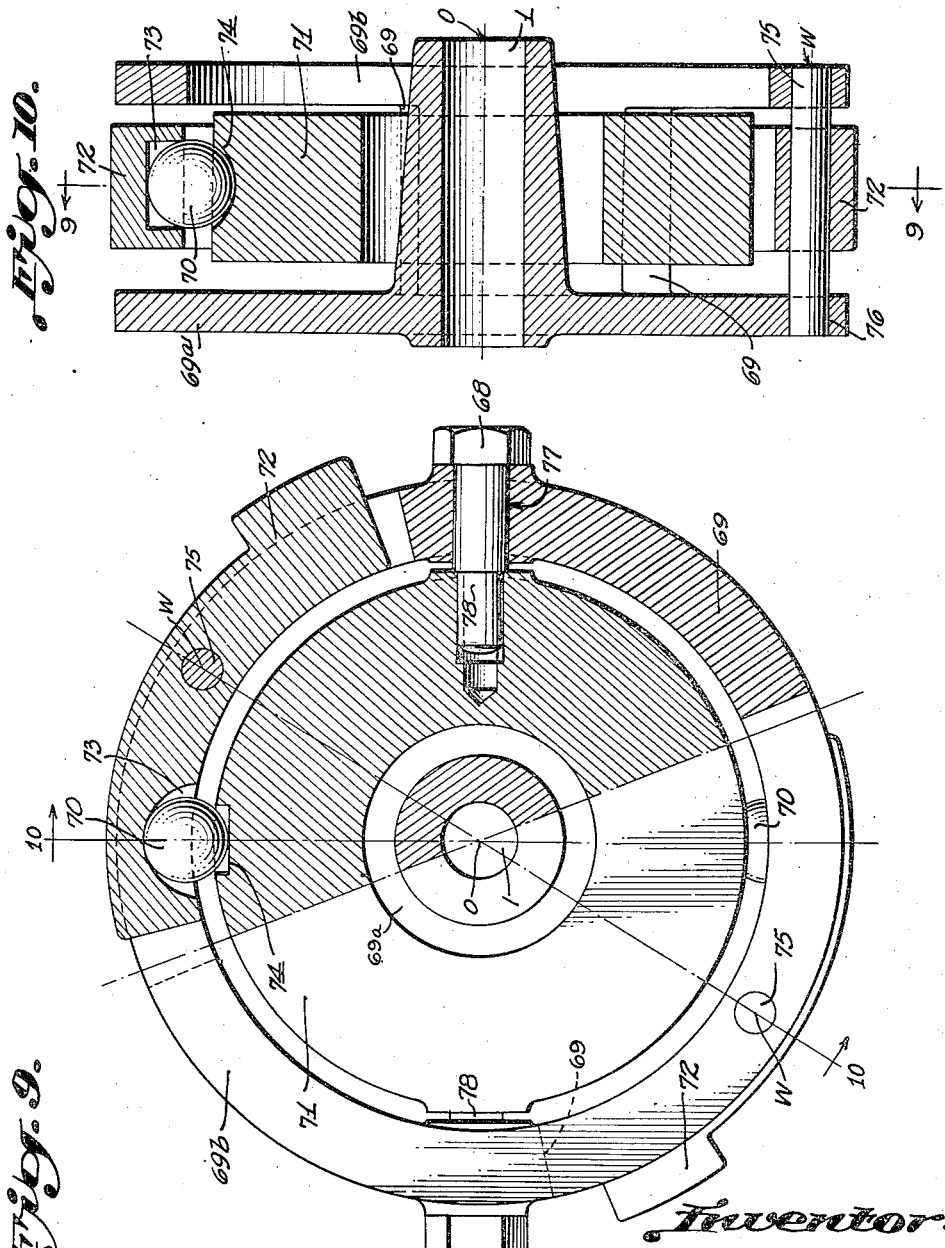
Inventor:
FRANCOIS M. M. B. SALOMON
By
Attorney.

Patented Oct. 30, 1945

2,387,775

UNITED STATES PATENT OFFICE 2,387,775

OSCILLATION REDUCING DEVICE

François Marie Michel Bernard Salomon, Paris, France; vested in the Alien Property Custodian Application May 6, 1940, Serial No. 333,561
In Luxemburg August 4, 1939

38 Claims. (Cl. 74—574)

Devices for reducing oscillations in general and particularly in machine shafts are already known which utilize centrifugal pendulums. As it is known, the centrifugal pendulums are movable masses which are submitted at the same time to radial inertia forces (centrifugal forces) and to tangential inertia forces and which rock about their mean positions under the restoring action of the centrifugal forces exerted on said masses.

My invention relates to quite different devices in which centrifugal pendulums are not utilized.

In a device according to my invention, at least one oscillating member, rotatively carried with the shaft and which is only substantially submitted to the tangential inertia forces and not to radial inertia forces (centrifugal forces), rocks under the action of disturbances and under the restoring action of at least one restoring member, acting as a restoring lever. The latter is rotatively carried with the shaft and is only substantially submitted to the radial inertia forces (centrifugal forces) and not to the tangential inertia forces.

In those conditions, a device according to my invention utilizes mainly two kinds of members operatively interconnected. These are oscillating members, which are not centrifugal pendulums, as they are only substantially submitted to the tangential inertia forces and not to the radial inertia forces (centrifugal forces), and centrifugal restoring members, which again are not centrifugal pendulums, as they are not submitted to the tangential inertia forces but substantially only to the radial inertia forces.

It is important to make this second point quite clear. In devices utilizing centrifugal pendulums, the latter 1. Rock at the frequency of the disturbances, and
2. Rock about a mean position for which the restoring centrifugal torque is nil.

On the contrary, according to my invention,

1. The oscillating motion of a restoring member is infinitely small during the oscillation motion of the "oscillating members" to which they are operatively connected. (In general, this oscillation angle is an infinitely small quantity of second order relatively to $\theta$, if the oscillation angle of the "oscillating member" is called $\theta$.)
2. This extremely small oscillation motion occurs, not about the position for which the centrifugal torque being exerted on the restoring member is nil—as for pendulums—but, on the contrary, about a position for which this centrifugal torque is relatively big, and often nearly maximum.

Accordingly, the difference between the restoring members according to my invention and the centrifugal pendulums is absolutely complete.

As it will be seen further on, great advantages result from this difference, namely, because the devices according to my invention can be very favorably adapted for the elimination of all harmonics, including the lowest and the highest, which is not the case in general for the devices utilizing centrifugal pendulums.

As to the shaft itself, it is not necessarily a shaft which must be preserved from vibrations, however, in many applications it is just a shaft. Although various kinds of "restoring members" can be used without exceeding the scope of my invention they include, in all cases, centrifugal elements. However, more especially, there is an advantage in using "restoring members" including merely bodies submitted only, at least substantially, to the centrifugal forces created by the rotating shaft which carries them along. The "restoring members" acting as restoring levers can be real levers or devices acting as such.

My invention is applicable to reducing speed oscillations and to the damping of torsional oscillations, flexional oscillations, and lateral oscillations in any machine parts, and especially in machine shafts in all sorts of engines, compression ignition engines, spark ignition engines, motor cars, compressors, ships, aeroplanes, etc.

The device can be put in any part of the machines and especially in any part of the engine shafts. For instance, it may be put at the front or at the rear of the crankshafts, in the balance-weights and even in the devices of connecting rods, in propeller hubs, etc.

It is often particularly advantageous to realize, more or less accurately, tuning conditions between the frequency of the disturbing forces and the natural frequency of the oscillating members, as it results of the action of the "restoring members."

In certain cases, this "tuning condition" can be made at the same time, not only, on one harmonic, but on two or several harmonics together, so that the same oscillating member—for instance, the same "harmonic disk"—can simultaneously eliminate the disturbances of two or several frequencies at the same time.

The connecting arrangement between the "oscillating members" and the "restoring members" and with the members carried along by the rotation of the shaft creating the centrifugal and restoring forces can be of any known type.

The "oscillating members" can, more particularly, be shaped like disks, fractions of disks, circular sectors, etc. They can be centered on the shaft or eccentric relatively to the axis of the shaft. Even in this last case, the working of the device is quite different from the one of the pendular systems, since the principle of the restoring forces is absolutely different.

It has already been said, indeed, that in the device according to my invention, the oscillating member has by itself substantially no restoring force under the action of the centrifugal forces, the restoring force being entirely due or almost entirely due to the action of the restoring member.

The advantages of the devices which the invention has for its object relatively to the known devices, and especially to dampers utilizing centrifugal pendulums, are very considerable for many different reasons. Those advantages of the devices contemplated by the invention can be substantially summed up as follows:

1. They can be very easily adapted to the elimination of the lowest and highest harmonics.

2. They are more efficient than the known dampers and especially than the dampers with centrifugal pendulums in given conditions and for a given weight for the oscillating members.

3. They make it possible to utilize to the best advantage, and in the simplest conditions, the available room.

4. The conditions of resonance depend on numerous and very different factors, which gives great facilities.

5. For given conditions, they are efficient at much lower speeds of rotation than are all known dampers.

6. They avoid the use of noisy abutments and their working is always absolutely noiseless.

7. They are of a very simple construction and of a very low cost price.

8. They afford in a very simple and efficient manner the elimination of two or several harmonics, simultaneously, with only one oscillating member, and this often in a better manner than the known devices.

Certain constructions in accordance with my invention are, by way of example, illustrated diagrammatically in the accompanying drawings, of which:

Fig. 1 is an end elevation view, partly in section, of one form of device embodying the present invention, the section being taken substantially on line 1—1 of Fig. 2;

Fig. 2 is a sectional view taken substantially along line 2—2 of Fig. 1;

Fig. 3 is a view similar to Fig. 1 of a second embodiment of the invention, the section being taken substantially on line 3—3 of Fig. 4;

Fig. 4 is a sectional view taken substantially along line 4—4 of Fig. 3;

Fig. 5 is a transverse sectional view of a device similar to the one shown in Figs. 3 and 4 when the same is mounted on the engine shaft of a vehicle, the section being taken substantially on line 5—5 of Fig. 6;

Fig. 6 is a sectional view taken substantially on line 6—6 of Fig. 5;

Fig. 7 is a sectional view showing the rim of a clutch intended to receive the device;

Fig. 8 is a sectional view of the device before the same is mounted in the structure shown in Fig. 7;

Fig. 9 is a view similar to Fig. 1 showing another embodiment of the invention which is applicable in the case when the oscillations to be eliminated are flexional or lateral, the section being taken substantially on line 9—9 of Fig. 10;

Fig. 10 is a sectional view taken substantially along line 10—10 of Fig. 9; and

Figure 11:
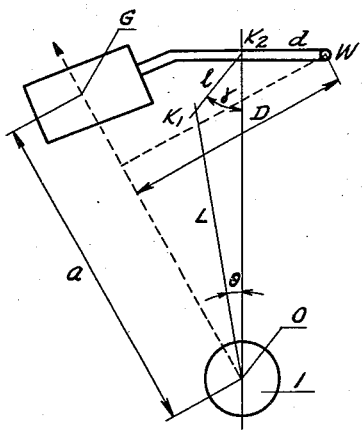
Figs. 11 and 12 are explanatory diagrams which bring into evidence the different lengths which intervene in the "tuning" conditions and, in particular, in the "resonance" conditions.

Figs. 1 and 2 are, respectively, a front and a side view of a device according to my invention, mounted on a flywheel 32 keyed, by a key 27, on a shaft 31 which may be, for instance, the shaft of an engine of a compression type or of a spark ignition type of a compressor, a motorcar or any vehicle, an aero engine, a propeller shaft, etc. (the hub of the propeller would then take the place of the web of flywheel 32).

The oscillating member is a disk 40. Said disk is centered on shaft 31 through the intermediary of a ring 38 (Fig. 2) which can be replaced by any bearing of a known type. The ring 38 is itself fixed by a key 48 and by the nuts and lock nuts 47. The disk 40 has, on its periphery, a channel-shaped cut of rectangular section (Fig. 2) bounded by two cheeks 41 and 42.

In the cut or channel of disk 40 are placed two restoring levers 45, 46. As to the cheeks 41 and 42, they both present, at 180 degrees, two cylindrical recesses 51 whereof the axes are $K_1$. The restoring levers 45 are mounted on axes 37 which are fixed into the flywheel 32 by their bearings 35, shoulders 36, washers 33, and nuts 34. Each restoring lever is crown-shaped and provided with a cylindrical recess 50 (Fig. 1) whereof the axis is $K_2$. The recesses 50 are also spaced 180 degrees apart and correspond to the recesses 51 of the disk 40.

Two rollers 43, whereof the cheeks are 44 and the axes M, pass through the recesses 50 and 51 which face each other. Said rollers are accordingly spaced at 180 degrees relatively to each other.

The action exerted by the centrifugal forces produced by the rotation of the shaft 31 gives to the center of gravity G (Fig. 1) of each restoring lever 45 a resultant tending to press each roller 43 between the ramp of a recess 51 of the disk 40 and the ramp of the recess 50 of the corresponding restoring lever 45.

The pins, whereof the shanks are 52 and the heads are 53, enable one to insert at the extremities of the restoring levers additional masses shaped like plates to adjust to the best advantage, in each case, the weight of each of these levers and the position of its center of gravity.

The operation is as follows:

Under the action of the disturbances, the disk 40 rocks about its mean position and the restoring levers 45, through the intermediary of the rollers 43, exert a restoring action on it. Indeed, under the action of the centrifugal forces and through the intermediatery of these rollers, these levers always tend to draw the disk toward its mean position in which the axes $K_2$, M and $K_1$ are on the same geometrical radius.

The device represented in Figs. 3 and 4 differs from the previous one only by the fact that the restoring levers 45 are so arranged that under the action of centrifugal forces they tend to press the rollers 43 between the ramps of the corresponding recesses and tend to move said rollers radially inward in the direction of the axis O of shaft 31. On the contrary, in the device of Figs. 1 and 2 the restoring levers 45 act on the rollers 43 by pulling—they tend to draw the rollers radially outward from the axis O of shaft 31.

The operation is the same for the two devices, the only difference being that, in the first case, the restoring levers act on the rocking disk 40 to pull it toward its mean position whereas, in the second case, the restoring levers act on the disk to push it toward its mean position.

In the various cases, it is in general advantageous to have the axis of the restoring lever, i. e., the axis 37 in the previous figures substantially on the perpendicular to the radius $OK_2$ at $K_2$.

Figs. 5 to 8, inclusive, refer to a similar device which is particularly intended to be fitted into a flywheel or in a vehicle engine clutch of a motorcar, for instance, or even in a ventilator pulley or against a pulley of an engine ventilator. The same device is applicable in the felloe of machine rotating members and for aero engines, marine engines, compressors, propeller hubs, etc.

Since the device of Figs. 5 to 8 is the same as the one of Figs. 3 and 4, the reference numbers are the same and a new description is believed to be unnecessary. The only different parts are the following: The central part of the web 56 is provided with holes 57 for bolts used in assembling the same on the shaft (not shown). The peripheral part of the rim web has been represented at 58. In Fig. 6, the device is mounted on a plate 60 carrying the axes 37 of two restoring members, which are in this case centrifugal levers 45. Plate 60 also acts as a lid, the same being fixed on the rim 58 by means of screws 59 and centered on the central part 56 by a bearing 61.

Figs. 9 and 10 relate to devices for compensating disturbances which are parallel with the axis O of the shaft 1, or which have a component which is parallel with said axis, said disturbances being sometimes called flexional oscillations or lateral oscillations.

The shaft 1 is secured by means of a web 69a to a felloe 69, 69b provided with two cylindrical bearing holes 77 for two spindles 78 which are locked in a disk 71 capable of oscillating about said spindles to either side of the mean position shown in Figs. 9 and 10 in response to the disturbances. Nuts 68 insure lateral guiding.

The device for restoring disk 71 to the mean position comprises two opposite restoring levers, including centrifugal masses 72 and journals 75, whereof the axes are W, said journals participating in the rotation of the shaft 1 and the axes W performing a similar function to that of the axes 37 of the devices shown in Figs. 1 to 4.

In the device of Figs. 9 and 10 the restoring action of the levers 72 on the disk 71 is effected through the intermediary of balls 70 which are clamped between rolling surfaces 73 carried by the restoring levers and surfaces 74 carried by the disk 71. Said surfaces could be spherical. As shown in Figs. 9 and 10, said surfaces are cylindrical with generatrices perpendicular to the plane of Fig. 9 for the surfaces 73 and generatrices located in the plane of Fig. 9 for the surfaces 74.

The center of gravity of each restoring lever 72 is so arranged that each cylindrical surface 73 presses against the corresponding ball 70 which, in turn, presses against the cylindrical surface 74 so as to push the disk 71 back to its mean position when it moves away therefrom in response to the action of the disturbances.

It would, on the other hand, be possible with a slightly different embodiment to use the principle of restoring to the mean position by pulling as in Figs. 1 and 2.

The operation is similar to that described for the previous figures which relate to devices intended to reduce oscillations of speed or torsional oscillations.

Figure 12:
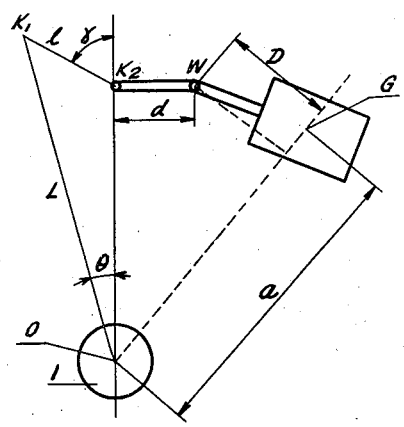

It has been well known for at least twenty-five years that in devices intended to reduce shaft oscillations it is often advantageous that the rocking members have a natural frequency substantially equal to that of the disturbances to be compensated for. It is quite obvious that the same applies in the case of the devices of the present invention. Figs. 11 and 12 are diagrams intended to make understood the dynamic and geometrical conditions which are to be realized for this purpose.

Fig. 11 relates to the case in which the restoring lever, whereof the axis is W, performs its function by extension, that is to say by pulling the oscillating member centered on the axis O toward its mean position.

Fig. 12 corresponds to the case in which the restoring lever, whereof the axis is W, acts on the contrary by pushing the oscillating member back toward its mean position.

Fig. 11 shows diagrammatically the restoring system as equivalent to a restoring lever, whereof the axis is W, on which is articulated at $K_2$ a rod of length $l$. Said rod is articulated on the other hand at $K_1$ on an oscillating member which is centered at O, has its center of gravity at O, and is capable of oscillating around the axis O to either side of its mean position. The oscillating member may, for instance, be a disk like the disk 40 in Figs. 1 to 4. For this mean position, the point $K_1$ is on a straight line with the points O and $K_2$. The angle $K_2 = \theta$ characterizes the angular displacement of the oscillating member relatively to its mean position.

The point $K_2$ remains substantially stationary, or at any rate its movements are infinitely small quantities of order two.

The geometrical point W is on the perpendicular to $OK_2$ at $K_2$ for the mean position of $K_2$ and it can be stated that:

$$WK_2 = d$$

$\gamma$ is the angle between $K_2K_1$ and $OK_2$.

G is the center of gravity of the restoring lever, including its centrifugal mass, and it can be stated that:

$$OG = a$$

$m$ is the total mass of the restoring lever or restoring levers.

M is the mass of the oscillating member centered on the axis O (for instance, the disk 40 of Figs. 1 to 4).

$r$ is its radius of gyration relatively to its center of gravity which is supposed to be at O.

D is the distance from the point W to the line OG.

I have discovered that, relatively to the disturbing torque $C \sin w\gamma$ having a pulsation $w$, the condition for resonance is substantially satisfied for all speeds of rotation of the shaft if, by construction, the condition $E = O$ is realized (E being the mean angular velocity of the shaft 1) by writing (I) $$E = \frac{N^2}{W^2} \cdot \frac{m.a.\frac{D}{d}.OK_1.\frac{OK_2}{K_1K_2}}{Mr^2} - 1$$

The ratio $$\frac{w}{n}$$

is often called the harmonic order $n$. The Equation (I) supposes that the following conditions are realized:

1. The angles $\theta$ and $\gamma$ are small and the movements of the restoring lever are negligible.
2. Frictions are negligible.
3. The only restoring forces are substantially the centrifugal forces which exert an action on the restoring lever.

The Equation (I) applies also to the case of the diagram of Fig. 12 on condition that $K_1K_2$ will always be considered in absolute value.

Finally, the Equation (I) namely applies to the case of Figs. 1 and 2 and to the case of Figs. 3 and 4 or Figs. 5 and 6, the structures of which are equivalent to the diagrams of Figs. 11 and 12, respectively.

For $E=O$, everything takes place as if the movement of inertia of the entire rotating system were infinite (positively for E very small and positive; negatively for E very small and negative).

It may be advantageous in various cases to give E other positive or negative values, namely, to avoid critical speeds.

Similar considerations and formulas, except for a few differences, apply to the case in which the system is intended to compensate for the components of disturbing forces which are parallel with the axis of the shaft 1, as is the case in the embodiment of Figs. 9 and 10.

Because of the fact that the oscillating member is more particularly disk-shaped and is very often tuned on a predetermined harmonic to compensate, those disks may be called "harmonic disks" since in various cases it is possible, according to my invention, to tune the systems to more than one harmonic at the same time. The oscillating disks may equally well be called "polyharmonic disks."

In the various arrangements, it is often advantageous for the recesses, such as for instance the recesses 50 and 51 (Figs. 1 and 3), or other recesses performing a similar function, to be inwardly provided with metallic rings which will generally be of hard metal such as illustrated in Fig. 5. There is often an advantage in letting those rings be loose in their recesses, or at least some of them, thereby enabling them to have an oscillating movement. Practically, this movement is extremely small. In this event, they will be mounted with very gentle friction in their housings. They could be mounted therein by means of special bearings such as ball, roller, or needle bearings.

The oscillating members (namely, harmonic disks) and the restoring members may be combined according to any other arrangement than those which have been shown in the accompanying drawings and, in particular, according to any arrangement which would be equivalent from a functional standpoint to the diagrams of Figs. 11 and 12.

In order to compensate for a plurality of different harmonics simultaneously, it is possible instead of tuning only one oscillating system on several harmonics at the same time to use a plurality of harmonic disks arranged parallel or even arranged in one and the same plane, each of them, in this case, being reduced to only one sector and each of them compensating only one harmonic. In the various cases, it is possible to obtain a greater amplification of the restoring forces by using two restoring levers or similar systems giving two successive amplifications of the restoring effects.

In the pendular centrifugal systems used as oscillating dampers, it is known that the pendular movement of a frequency $f$ creates a perturbation of frequency $2f$, which is small in many cases. In the systems according to my invention, this disturbance is also very small and is generally even smaller than in the pendular systems if, as preferred, a certain condition is observed in reference to the direction of the rotating movement of the shaft. This condition is to place the restoring levers so that while they turn or pivot in the direction of the rotation of the driving shaft, i. e., shaft 1 or 31 in the accompanying figures, the centers of gravity of the restoring levers will move toward the axis O of the shaft.

Although the oscillatory movements of the oscillating members must preferably take place with little or very little friction, the scope of the invention would not be exceeded if friction were introduced into said movements by means of solids, fluids, or otherwise, or even if restoring springs were introduced. Those springs could have a very small function or a function of substantial importance.

It is quite clear that the restoring levers may be of the most varied shapes and accordingly the expression "restoring lever" is in no way limitative. My invention concerns, in a general manner, any arrangement for the transformation of the restoring forces, whatever means may be employed.

Having now particularly described and ascertained the nature of my said invention and in what manner the same operates, I declare that what I claim is:

1. In a device for reducing oscillations in structures, a shaft, an oscillating weight member mounted on said shaft to be rotated thereby and angularly movable relative thereto, at least one centrifugal restoring member, means for pivotally mounting said restoring member, said means being supported by the shaft, said weight member and said restoring member each having at least one curved surface, and at least one rigid connecting member rollably engaging said surfaces to operatively connect said members and transmit forces from said restoring member to said weight member.

2. In apparatus of the class described, rotatable means, at least one oscillatable weight member supported by said rotatable means for angular motion relative thereto, said weight member having a mean position relative to said rotatable means, a plurality of pivotally mounted restoring members carried by said rotatable means for restoring said weight member to said mean position, the pivotal axis of each restoring member being spaced from the center of gravity thereof, and force transmitting means operatively connecting said restoring members to said weight member, said last-named means comprising a plurality of rigid elements, each of said elements being in rolling engagement with curved surfaces on the weight member and one of the restoring members, the radius of curvature of both of said curved surfaces being appreciably greater than the radius of the element engaging the same.

3. In a device for reducing oscillations in structures, rotatable means, an oscillatable weight member supported by said rotatable means for angular movement about a mean position relative to said rotatable means, at least one restoring member, means for mounting said restoring member for pivotal movement about an axis rotatable with said rotatable means, said restoring member being centrifugally actuated and acting as a lever for restoring the weight member to said mean position, and at least one force transmitting member operatively connecting said oscillatable weight member and said restoring member, said force transmitting member having rolling engagement with oppositely facing surfaces on the weight member and the restoring member.

4. In a device for reducing oscillations in structures, rotatable means, an oscillatable member mounted on said rotatable means and angularly movable relative thereto, one or more pivotal restoring members mounted on said rotatable means for rotation therewith, said restoring members being responsive to centrifugal forces during rotation of said rotatable means and acting as levers for applying a restoring force for moving said oscillating member to a predetermined mean position relative to said rotatable means, and one or more connecting members engaging said restoring members and said oscillatable member for transmitting the restoring forces from said restoring members to said oscillatable member, the pivotal axis of each restoring member being so located that a line perpendicular thereto and containing a point of contact between said oscillatable and connecting members is also perpendicular to a radius from the axis of said rotatable means containing said point of contact when said oscillatable member is in said mean position.

5. A device for reducing vibrations of a moving part, comprising two elements including a mass and a member pivotally connected to the moving part, both of said elements having openings therein to form runways, and a rolling body of less diameter than either of said openings extending through said openings.

6. In apparatus of the class described, rotatable means, a mass supported by said means for oscillation relative thereto, means pivotally connected to said rotatable means for rotation therewith, said mass and pivoted means each having a curved surface thereon, and a rollable body engageable by said surfaces when said pivoted means is subjected to centrifugal forces during rotation of said rotatable means, the radius of said body being less than the radius of curvature of either of said surfaces.

7. In apparatus of the class described, rotatable means, weight means supported by said rotatable means for oscillation relative thereto, centrifugally responsive pivoted means mounted on said rotatable means for rotation therewith, said weight means and pivoted means each having a curved surface thereon, and means movable along said surfaces and adapted to transmit forces from said pivoted means to said weight means to resist oscillation of said weight means.

8. In apparatus of the class described, rotatable means, weight means oscillatable relative to said rotatable means, pivoted means mounted on said rotatable means and responsive to centrifugal forces during rotation of the latter, said weight means and pivoted means each having a curved surface thereon, said surfaces being concave toward each other, and means engageable by and movable along said surfaces for transmitting forces from said pivoted means to said weight means.

9. In apparatus of the class described, rotatable means, weight means supported by said rotatable means for oscillation relative thereto, pivoted means responsive to centrifugal forces mounted on said rotatable means for rotation therewith, and force transmitting means interposed between surfaces on said weight means and said pivoted means, at least one of said surfaces having a concave curvature, whereby said weight means is normally maintained in a predetermined mean position relative to said rotatable means during rotation of the latter, said force transmitting means having substantially line contact with both said surfaces.

10. In apparatus of the class described, rotatable means, weight means supported by said rotatable means for oscillation relative thereto, pivoted means responsive to centrifugal forces mounted on said rotatable means for rotation therewith, and force transmitting means interposed between surfaces on said weight means and said pivoted means, at least one of said surfaces having a concave curvature, whereby said weight means is normally maintained in a predetermined mean position relative to said rotatable means during rotation of the latter, said force transmitting means having substantially point contact with both of said surfaces.

11. A rotatable structure comprising a rotatable member, a weight member oscillatable relative to said rotatable member, and means operatively connecting said members, said connecting means comprising an element responsive to centrifugal forces and pivotally mounted on one of said members, said element and the other of said members having curved surfaces thereon, and a rollable force transmitting element engageable by said surfaces, the radius of said rollable element being appreciably less than the radius of curvature of either of said surfaces.

12. In apparatus of the class described, a rotatable member, at least one oscillatable weight member supported by said rotatable member for angular motion relative thereto, said weight member having a mean position relative to said rotatable member, a restoring member pivoted eccentrically of the center of gravity thereof to said rotatable member, said restoring member having a concave notch therein and said weight member having a second concave notch facing in an opposite direction to said first notch, and a rollable body fitting between and tangentially engaging said concave notches, whereby the restoring member is operatively connected to said weight member.

13. In an apparatus of the class described, a rotating means, at least one oscillatable weight member supported by said rotating means for angular motion relative thereto, said weight member having a mean position relative to said rotating means, a restoring member pivoted eccentrically of the center of gravity thereof to said rotating means, one of said members having a concave notch therein and the other of said members having a bearing surface facing in an opposite direction to said notch, and a rollable body fitting between and tangentially engaging said notch and said surface, whereby the restoring member is operatively connected to said weight member.

14. In a device for reducing oscillations, rotatable driving means, restoring means pivotally mounted on said driving means for rotary movement therewith and pivotal movement relative thereto about an axis substantially parallel to the axis of rotation of said driving means, and oscillatable weight means supported by said driving means independently of said restoring means and for angular movement relative to said driving means, said weight means having a predetermined mean position relative to said driving means and being operatively associated with said restoring means, the latter being actuated by centrifugal forces during rotation of said driving means for restoring said weight means to said mean position from either side of said position.

15. In apparatus of the class described, rotatable driving means, an oscillatable damping mass having a predetermined mean position relative to said driving means, and restoring means rotatable with said driving means and adapted for pivotal movement relative to said driving means about an axis substantially parallel to the axis of rotation of said driving means, said restoring means having the center of gravity thereof so positioned and being so operatively associated with the said mass as to transmit centrifugal forces, substantially unaffected by the tangential inertia of said restoring means, to said mass for yieldably maintaining the latter in said mean position during operation of said driving means.

16. In apparatus of the class described, rotatable driving means, weight means oscillatable relative to said driving means and having a predetermined mean position relative thereto, and centrifugally responsive means pivotally mounted on said driving means for pivotal movement about an axis substantially parallel to the axis of rotation of said driving means and operatively associated with said weight means for normally maintaining the latter in said mean position, said centrifugally responsive means being so constructed and mounted on said driving means that the tangential inertia thereof has substantially no effect on the pivotal movement thereof by centrifugal forces acting thereon.

17. In apparatus for damping oscillations, rotatable driving means, weight means supported by said driving means and oscillatable relative thereto, and means for resisting oscillation of said weight means, including pivoted means responsive to centrifugal forces and so constructed and mounted on said driving means for pivotal movement about an axis substantially parallel to the axis of rotation of said driving means that the tangential inertia of said pivoted means has little or no effect on the force applied to said weight means by said resisting means during rotation of said driving means.

18. In apparatus of the class described, rotatable driving means, at least one centrifugally actuated restoring means pivotally mounted on said driving means for rotary movement therewith, and at least one oscillatable damping mass supported by said driving means independently of said restoring means and for angular movement relative to said driving means, said damping mass having a predetermined mean position relative to said driving means and being operatively connected to said restoring means by an element having a smooth circular surface engaging smooth surfaces on said mass and restoring means, said restoring means acting on said element to apply centrifugal forces to said damping mass for yieldably maintaining the latter in said mean position throughout a wide range of speeds of said driving means.

19. In apparatus of the class described, rotatable driving means, centrifugally responsive means mounted on said driving means, and an oscillatable damping mass mounted on said driving means independently of said centrifugally responsive means for angular movement relative to said driving means, said damping mass having a predetermined mean position relative to said driving means and being operatively connected with said centrifugally responsive means, the latter being effective during rotation of said driving means to continuously exert a force on said mass which resists movement of the latter in either direction from said mean position.

20. In apparatus of the class described, rotatable driving means, centrifugally responsive means mounted on said driving means for rotation therewith, and oscillatable weight means supported by said driving means independently of said centrifugally responsive means, said weight means being operatively associated with said centrifugally responsive means and having a predetermined mean position relative to said driving means, the centrifugal forces acting on said centrifugally responsive means being effective during rotation of said driving means to apply a force to said weight means, said last-named force being directed radially from the axis of rotation of said driving means and adapted to resist oscillatory movement of said weight means in either direction from said mean position.

21. In apparatus of the class described, rotatable driving means, weight means supported by said driving means for oscillation relative thereto, and pivoted means mounted on said driving means for rotation therewith, said pivoted means being operatively associated with said weight means and responsive to centrifugal forces during rotation of said driving means for exerting a pulling action on said weight means, said action being directed substantially radially away from the axis of rotation of said driving means and tending to maintain said weight means in a predetermined mean position relative to said driving means throughout a wide range of speeds.

22. In apparatus of the class described, rotatable driving means, weight means supported by said driving means for oscillation relative thereto, pivoted means mounted on said driving means for rotation therewith and responsive to centrifugal forces, and rigid force transmitting means interposed between and movable along smooth surfaces on said weight means and said pivoted means, said surfaces and force transmitting means being so formed that said weight means will normally assume a predetermined mean position relative to said pivoted means when the latter is subjected to centrifugal forces during operation of said driving means.

23. Apparatus of the class described comprising rotatable driving means, two elements including a mass and a member responsive to centrifugal forces pivotally connected to said driving means, both of said elements having guide surfaces thereon, and force transmitting means interposed between and movable along said guide surfaces, said guide surfaces and force transmitting means being so formed that said mass will normally assume a predetermined mean position relative to said driving means when said pivoted member is subjected to centrifugal forces during rotation of the driving means.

24. In apparatus of the class described, rotatable driving means, oscillatable weight means mounted on said driving means for free angular movement relative thereto and having a predetermined mean position relative to said driving means, and pivoted means mounted on said driving means for rotation therewith and pivotal movement relative thereto about an axis substantially parallel to the axis of rotation of said driving means, said pivoted means being operatively associated with said weight means and responsive to centrifugal forces during rotation of said driving means for resisting movement of said weight means in either direction relative to said driving means from said mean position.

25. In apparatus of the class described, rotatable driving means, a rotatable damping mass mounted on and adapted to oscillate relative to said driving means, and at least one restoring means pivotally mounted on said driving means for pivotal movement about an axis substantially parallel to the axis of rotation of said driving means and operatively associated with said mass so that the centrifugal forces acting through said restoring means constitute substantially the sole force for restoring said mass to a predetermined mean position relative to said driving means during oscillation of the latter.

26. In apparatus of the class described, rotatable driving means, a rotatable damping mass mounted for oscillatory movement relative to said means, said mass having a predetermined mean position relative to said driving means during operation of the latter, and at least one restoring member pivotally mounted on said driving means and operatively connected by non-resilient means with said mass so that centrifugal forces acting on said restoring member apply a force to said mass which tends to prevent movement of said mass in either direction from said mean position, the force applied to said mass being directed substantially radially with respect to the axis of rotation of said driving means.

27. In apparatus of the class described, rotatable driving means, weight means mounted on and adapted for oscillatory movement relative to said driving means, and means for operatively connecting said driving means and said weight means to impart rotary motion to the latter, said connecting means comprising centrifugally responsive means pivotally mounted on one of the two first-named means and so connected with the other of said two first-named means that the centrifugal force of said centrifugally responsive means is rendered effective to apply a force to said other means for urging said weight means toward a predetermined mean position relative to said driving means from either side of said position, the force applied to said other means being radially directed with respect to the axis of rotation of said driving means.

28. In apparatus of the class described, rotatable driving means comprising a member, oscillatable means comprising a weight member mounted on said driving means, and means operatively connecting said driving means and said oscillatable means for imparting rotary motion to the latter, said connecting means including centrifugally responsive means pivotally mounted on one of said members for pivotal movement thereon about an axis substantially parallel to the axis of rotation of said driving means and rigid means so interconnecting said centrifugally responsive means and the other of said members as to render the centrifugal force of said centrifugally responsive means effective to yieldably maintain said weight member in a predetermined mean position relative to said driving means at substantially all normal operating speeds of the latter.

29. In apparatus of the class described, rotatable driving means comprising a member, oscillatable means comprising a weight member, and means operatively connecting said driving means and said oscillatable means for imparting rotary motion to the latter, said connecting means including centrifugally responsive means pivotally mounted on one of said members and non-resilient force-transmitting means engageable by and movable along curved surfaces on said centrifugally responsive means and the other of said members.

30. In apparatus of the class described, rotatable driving means comprising a member, oscillatable means comprising a weight member, and means operatively connecting said driving means and said oscillatable means for imparting rotary motion to the latter, said connecting means including centrifugally responsive means pivotally mounted on one of said members and force-transmitting means interposed between and movable along surfaces on said centrifugally responsive means and the other of said members, said surfaces and said force-transmitting means being so formed that said weight member is normally urged toward a predetermined mean position relative to said driving means during rotation of the latter by the application of a force to said other member in a substantially radial direction relative to the axis of rotation of said driving means in response to centrifugal forces acting on said centrifugally responsive means.

31. Apparatus for reducing oscillations comprising rotatable driving means, weight means, and means operatively connecting said two first-named means whereby said weight means rotate with and are adapted for limited oscillation in two opposed directions from a mean position relative to said rotatable driving means, said connecting means including centrifugally responsive means pivotally movable about an axis substantially parallel to the axis of rotation of said driving means and adapted to apply a force to one of said two first-named means for restoring said weight means to said mean position from either side thereof, said force being substantially radially directed with respect to said axis of rotation.

32. Apparatus for reducing oscillations of rotatable means comprising a damping mass, the resistance of said mass to rotation being relatively small and not materially affected by the varying angular speed thereof, and means operatively connecting said rotatable means and mass whereby said mass is caused to rotate with and is adapted for limited oscillation relative to said rotatable means, said connecting means including centrifugally responsive means adapted to apply a force which is substantially unidirectional with respect to said damping mass for restoring the latter to a predetermined mean position relative to said rotatable means whenever said mass moves out of said mean position.

33. Apparatus for reducing oscillations of a rotatable part comprising a damping mass, and means operatively connecting said mass and said rotatable part whereby said mass is caused to rotate with and is adapted for limited oscillation relative to said rotatable part, said connecting means including centrifugally responsive means adapted to exert a force which acts in only one general direction with respect to said mass for restoring the latter to a predetermined mean position relative to said part from either side of said position.

34. Apparatus for reducing oscillations of a rotatable part comprising a damping mass, and means operatively connecting said mass and said rotatable part whereby said mass is caused to rotate with and is adapted for limited oscillation relative to said rotatable part, said connecting means including centrifugally responsive means adapted to exert a force which is directed radially of the axis of rotation of said mass to yieldably maintain the latter in a predetermined mean position relative to said rotatable part and further including rigid means wholly disconnected from said part and loosely associated with and constituting the sole force-transmitting connection between said centrifugally responsive means and said damping mass.

35. Apparatus for reducing oscillations of a rotatable part comprising a damping mass, and means operatively connecting said mass and said rotatable part whereby said mass is caused to rotate with and is adapted for limited oscillation relative to said rotatable part, said connecting means being constituted solely by rigid elements and including centrifugally responsive means adapted to apply to said mass a force which is substantially radially directed with respect to the axis of rotation of said mass and substantially unidirectional with respect to said mass for yieldably maintaining said mass in a predetermined mean position relative to said rotatable part during rotation of the latter.

36. Apparatus for reducing oscillations of rotatable means comprising a damping mass, and means operatively connecting said mass and rotatable means whereby said mass is caused to rotate with and is adapted for limited oscillation relative to said rotatable means, said connecting means including pivoted centrifugally responsive means and being such that pivotal movement of said centrifugally responsive means in response to centrifugal force is positively limited by rigid means and also being such that said damping mass necessarily assumes a predetermined mean position relative to said rotatable means when said centrifugally responsive means is in its limiting position, the center of gravity of said centrifugally responsive means and the pivotal axis thereof being in different radial planes containing the axis of rotation of said rotatable means when said centrifugally responsive means is in said limiting position.

37. Apparatus for reducing oscillations of rotatable means comprising a damping mass, and means including pivoted centrifugally responsive means for operatively connecting said mass and said rotatable means whereby said mass is caused to rotate with and is adapted for limited oscillation relative to said rotatable means, the pivotal movement of said centrifugally responsive means by centrifugal forces acting thereon being about an axis parallel to the axis of rotation of said rotatable means and being positively limited by said connecting means to prevent the center of gravity thereof from moving into a plane containing said axes, said connecting means being such that said centrifugally responsive means is moved from its limiting position against the efforts of the centrifugal forces acting thereon whenever said damping mass moves from said mean position relative to said rotatable means.

38. In apparatus of the class described, rotatable driving means, centrifugally responsive means pivotally mounted on said driving means for pivotal movement about an axis parallel to the axis of rotation of said driving means, and an oscillatable damping mass mounted on said driving means independently of said centrifugally responsive means for angular movement relative to said driving means, said damping mass having a predetermined mean position relative to said driving means and being operatively connected with said centrifugally responsive means by means adapted to so limit the pivotal movement of the latter by centrifugal forces that the center of gravity thereof cannot move into a plane containing said axes, whereby said centrifugally responsive means are effective during rotation of said driving means to resist movement of said mass in either direction from said mean position.

FRANÇOIS MARIE MICHEL BERNARD SALOMON.